United States Patent
Tsetsorin

(10) Patent No.: US 7,059,090 B2
(45) Date of Patent: Jun. 13, 2006

(54) FAIRING ACCESS DOOR WITH REINFORCEMENT AND METHOD OF MANUFACTURE

(75) Inventor: Boris N. Tsetsorin, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 10/729,059

(22) Filed: Dec. 4, 2003

(65) Prior Publication Data

US 2005/0120635 A1    Jun. 9, 2005

(51) Int. Cl.
  *E06B 1/04*    (2006.01)
(52) U.S. Cl. ............... 52/210; 52/211; 52/213; 52/297; 49/504; 244/118.1
(58) Field of Classification Search ............. 49/504; 52/204.1, 210, 211, 212, 213, 297, 395, 750; 244/118.1, 118.2, 127, 131
See application file for complete search history.

(56) References Cited

U.S. PATENT DOCUMENTS

| | | | | |
|---|---|---|---|---|
| 1,619,631 A | * | 3/1927 | Patasnik | 52/204.62 |
| 3,511,006 A | * | 5/1970 | Medow | 52/301 |
| 4,665,666 A | * | 5/1987 | Hampton | 52/86 |
| 4,780,998 A | * | 11/1988 | Knapp | 52/211 |
| 4,819,392 A | * | 4/1989 | Day | 52/211 |
| 5,115,605 A | * | 5/1992 | Butler | 52/105 |
| 5,526,618 A | * | 6/1996 | Thomas | 52/211 |
| 5,547,629 A | | 8/1996 | Diesen et al. | |
| 5,572,834 A | * | 11/1996 | Lilly | 52/85 |
| 6,401,405 B1 | * | 6/2002 | Hicks | 52/88 |
| 6,585,839 B1 | | 7/2003 | Woods et al. | |
| 6,898,903 B1 | * | 5/2005 | Thomas | 52/86 |

\* cited by examiner

Primary Examiner—Carl D. Friedman
Assistant Examiner—Chi Q. Nguyen
(74) Attorney, Agent, or Firm—Thomas F. Lebens; Fitch, Even, Tabin & Flannery

(57) ABSTRACT

The present embodiments provide methods and apparatuses for use in reinforcing access door apertures and other apertures formed in fairings. Some embodiments provide an apparatus that includes a door aperture formed in a facesheet and a first load deflector having a length, wherein the first load deflector is curved along at least a portion of its length. The first load deflector is secured with the facesheet proximate the aperture such that the first load deflector deflects a load. In some embodiments the first curved load deflector comprises a majority of layers having orientations along the load to be deflected. The apparatus can further include a patch bonded with the facesheet proximate the aperture such that the patch surrounds the door aperture.

16 Claims, 7 Drawing Sheets

FAIRING ACCESS DOOR WITH REINFORCEMENT AND METHOD OF MANUFACTURE

BACKGROUND OF THE INVENTION

The present invention relates generally to fairing access doors, and more particularly to reinforced access doors.

Typically, spacecraft fairings include a plurality of access doors. These access doors provide access into the spacecraft so that the spacecraft can be serviced after being encapsulated by the fairing. The location of some access doors can be common to a plurality of fairings. However, the majority of access doors are specific to individual designs. Door sizes can also vary. Common round doors can have diameters of 24 to 36 inches. However, smaller and larger doors are sometimes utilized.

If the locations of the doors are known before the composite fairing is laid-up, then reinforcing about the access door can be included during the fabrication process of the fairing. However, in attempts to improve assembly line processing, it is typically preferred to make the fairings identical, and then add additional access doors after fabrication in order to meet specific design specifications.

Additional structural reinforcement is typically added to the fairing around access doors added after fabrication to maintain the fairing structural integrity. Further, the reinforcements are typically added to both the interior of the fairing as well as the exterior. Previous reinforcement methods and structures have resulted in numerous problems in constructing the reinforcements, securing the reinforcements onto the fairing, interfering with further assembly of the spacecraft and other problems.

SUMMARY OF THE INVENTION

The present invention advantageously addresses the needs above as well as other needs by providing an apparatus and method for use in reinforcing access door apertures and other apertures formed in fairings by deflecting axial loads. Some embodiments provide an apparatus for use in deflecting loads that includes a door aperture formed in a facesheet, wherein the door aperture has an edge, and a first load deflector having a length, wherein the first load deflector is curved along at least a portion of its length. The first load deflector is secured with the facesheet such that the first load deflector is proximate the door aperture where a middle portion of the curved load deflector is closest to the aperture such that the first load deflector deflects a load. In some embodiments the first curved load deflector comprises a majority of layers having orientations along the load to be deflected.

The apparatus for use in deflecting loads can further include a patch bonded with the facesheet proximate the door aperture such that the patch at least surrounds the door aperture. In some embodiments, the apparatus can further comprise a second curved load deflector that is secured with the facesheet proximate the door aperture and on an opposite side of the door aperture than the first curved load deflector. The second load deflector has a length, wherein the second load deflector is curved along at least a portion of its length such that the second load deflector deflects the axial load.

Some embodiments provide an apparatus for use in reinforcing an access door. The apparatus can include a first load deflector positioned on a facesheet proximate an access door aperture. The first load deflector has a first length and the first load deflector is curved along at least a portion of its length. The first curved load deflector further include a first defined curvature such that the first defined curvature of the first load deflector is proportional to a size of the access door aperture. The embodiments can additionally include a second load deflector positioned on the facesheet proximate the access door aperture, the second load deflector has a second length such that the second load deflector is curved along at least a portion of its length, and a second defined curvature such that the second defined curvature of the second load deflector is proportional to the size of the access door aperture. In some embodiments, the first and second curved load deflectors have thicknesses, wherein the first and second thicknesses are proportional to design loads and are dependent on the defined curvatures of the first and second load deflectors, respectively, and the defined curvatures of the first and second load deflectors are further dependent on the thicknesses of the first and second load deflectors, respectively.

Additional embodiments provide a method for use in manufacturing a spacecraft fairing. The method can include assembling a fairing, cutting an access door aperture through the fairing, securing a first load deflector with the fairing proximate the access door where the first load deflector has a first curvature, and securing a second load deflector with the fairing proximate the access door wherein the second load deflector has a second curvature. The method can further include determining a first and second positioning of the first and second curved load deflectors, respectively, determining a first and second thickness of the first and second curved load deflectors such that the first and second thicknesses are dependent on the first and second positioning, respectively.

A better understanding of the features and advantages of the present invention will be obtained by reference to the following detailed description of the invention and accompanying drawings, which set fourth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
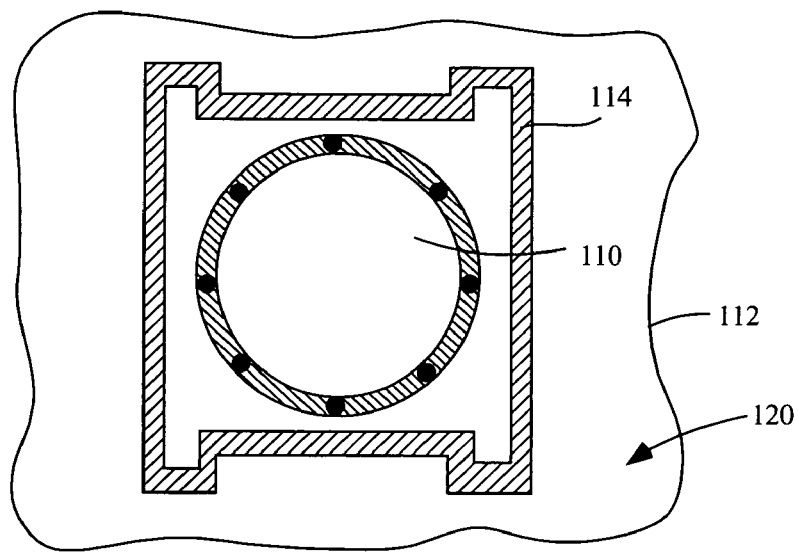
FIG. 1 depicts a simplified plane view of an access door aperture or hole incorporated into a fairing of a spacecraft reinforced with load bearing doublers.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

These various embodiments provide systems, apparatuses and methods for use in reinforcing access doors and/or ports of spacecraft fairings and other similar structures. Further, embodiments provide methods for constructing and/or assembling access doors with reinforcement and/or load deflection.

A number of access doors typically need to be included and/or built into spacecraft fairings so that the spacecraft can be serviced after it has been encapsulated by the fairing. The positioning of some of these doors in the fairings is common to all fairings, while the majority of doors are specific according to individual designs.

A typical access door is 24 to 36 inches in diameter and requires the surrounding area to be reinforced to redistribute the loads around the large opening. If the locations of the doors are known before the composite fairing is laid-up, then the reinforcing can sometimes be included during the fabrication process. To improve the assembly line process, however, it is preferred to make the fairings identical and add a few additional doors at a later date to meet a customer's specification.

Previous access doors were often reinforced with large load bearing doublers. These doublers were typically bonded to both the inside and outside surfaces of a fairing. FIG. 1 depicts a simplified plane view of an access door aperture or hole 110 incorporated into a fairing 112 of a spacecraft reinforced with a load bearing doubler 114. The door aperture 110 is formed or cut into the fairing 112. A large "H" shaped load bearing doubler 114 is shown surrounding the door aperture 110 and secured with the exterior surface 120 of the fairing 112. Typically, previous access apertures 110 are also reinforced with one or more doublers on the interior surface 122 (see FIG. 2) of the fairing because a single doubler typically does not provide adequate support to meet design and/or safety margins. Some prior access doors were reinforced with circular or "O" shaped doublers, also bonded onto both interior and exterior surfaces of the fairing.

Two doublers were typically employed to achieve a sufficient load bearing for the edge of the door aperture of the fairing. Without these two doublers, the fairings typically failed at the door apertures through sheer crimping and/or facesheet wrinkling.

Figure 2:
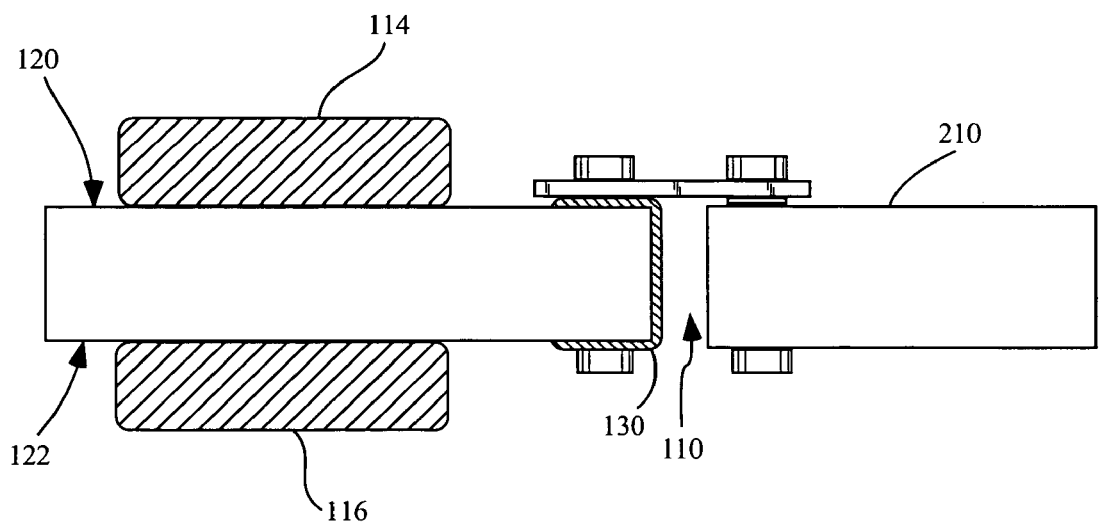
FIG. 2 depicts a cross-sectional view of a portion of the fairing with the access door aperture shown in FIG. 1.

FIG. 2 depicts a cross-sectional view of a portion of the fairing 112 with the access door aperture 110 shown in FIG. 1. An access door 210 is secured in the access aperture 110. Again, the aperture 110 is reinforced with two large doublers 114 and 116 bonded on both the exterior surface 120 and interior surface 122 of the fairing 110, respectively. The previous doublers typically failed to provide adequate reinforcement unless both exterior and interior doublers 114, 116 were bonded with the fairing.

Fabricating the fairing and bonding the interior doubler 116 can be particularly difficult. In many instances it was difficult to gain sufficient access to the interior surface surrounding the door aperture. Similarly, accurately positioning the doubler 116 around the aperture and bonding the doubler with the interior surface 122 could also be very problematic. Further, the difficultly in accessing, positioning and bonding of doublers resulted in added time for fabrication, required additional tools and/or tooling in some instances, as well as added cost.

Additionally, many prior access door apertures included additional reinforcement 130 right at the edge of the aperture. This additional reinforcement was added to compensate for the limited load bearing of prior load bearing doublers. In some prior designs, this added reinforcement 130 was a composite putty applied around the edge of the aperture 110.

Some spacecrafts additionally utilize an acoustic blanket that is installed along at least portions of the interior surface 122 of the fairing. The interior doubler 116 can interfere with the installation of an acoustic blanket, making it more difficult to secure, and more time consuming and more costly to install.

Figure 3:
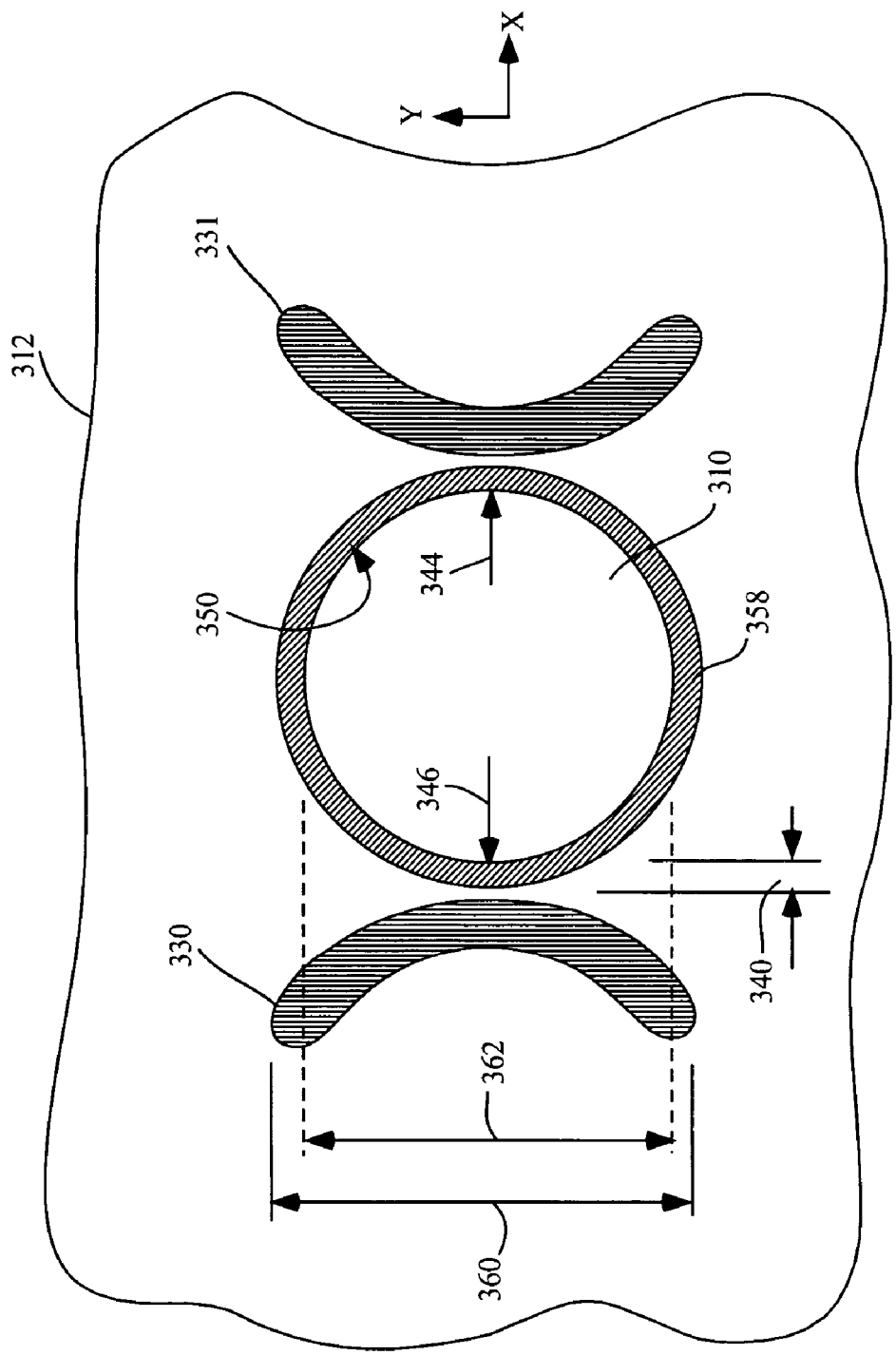
FIG. 3 depicts a simplified plane view of an access aperture incorporated into a fairing.

FIG. 3 depicts a simplified plane view of an access aperture 310 incorporated into a fairing 312. The access door aperture is reinforced with curved load deflectors 330 and 331 according to present embodiments. One or more curved load deflectors 330–331 are positioned proximate the aperture 310. The curved load deflectors 330–331 are specifically configured to reduce the concentration of the line loads at the sides of the aperture 310. It is well understood that an access door aperture experiences compression forces and/or loads parallel with the X-axis, and tension forces along the Y-axis. Typically, the greatest compression loads on the aperture 310 are along the X-axis at about the points indicated by reference numbers 344 and 346 as indicated in FIG. 3 (or at about 3 and 9 o'clock if viewing the aperture as a clock face).

The curved feature of the load deflector redirects loads to reduce the concentration of axial loads at the sides 344, 346 and/or circumference 350 of the aperture 310. Depending on the thickness, the curvature and the positioning of the load deflectors 330–331 relative to the size of the aperture 310, the loads can be redirected from the sides. In some preferred embodiments the loads can be deflected by 20 degrees or more, preferably more than 30 degrees, and more preferably more than 45 degrees.

Additionally, in some preferred embodiments the curved load deflectors are positioned symmetrically long the sides and/or about the circumference of the access door aperture 310. The curved structure deflects loads, which are predominately in the axial direction, away from the sides of the aperture. This deflection of loads provides a positive margin of safety for a shear crimping failure mode reducing the concentration of loads at the sides of the aperture.

The one or more curved deflector 330–331 are optimally positioned proximate the aperture 310 to better minimize the potential for sheer crimping. The positioning proximate the aperture can depend on the size of the aperture, the curvature of the deflector, the thickness of the curved deflector, the width of the curved deflector and other similar factors. Similarly, the positioning can depend on the material of the deflector. In some embodiments, the curved deflectors 330–331 are positioned as close to the aperture edge 350, with the curved portion closest to the aperture edge, without being or only minimally being overlapped by an access door cover 358. In preferred embodiments, the curved deflector is directly adjacent the access door cover 358. For example, in some preferred embodiments with an aperture that is 24 inches in diameter 362, the distance 340 between the deflector 330 and the aperture edge 350 is preferably less than 5 inches, more preferably less than 3 inches and still more preferably less than 2 inches.

Similarly, curved deflectors 330–331 have defined curvatures over at least a portion of their lengths. Typically, the curvature extends over a majority of the length of the deflectors. The defined curvature of the deflectors 330–331 are strategically defined and manufactured to better optimize the deflection of the line loads. The precise curvature can vary within predefined ranges that continue to provide deflection of the loads. The curvature employed is dependent on the size of the aperture, the distance 340 the deflector 330–331 is from the aperture edge 350, the thickness of the deflector, the width of the deflector and other similar factors. In some embodiments, a Nastran finite element analysis is performed to better optimize the thickness, curvature, width and location of the curved load deflectors 330–331 relative to the access door aperture 310.

The length 360 of the load deflectors are designed to provide load deflection for the door aperture while attempting to minimize added weight. Typically, the load deflectors 330, 331 have lengths 360 that are at least equal with the diameter of the door aperture 362. In some preferred embodiments, the length 360 is greater than the door aperture diameter 362 to provide added load deflection.

Figure 4:
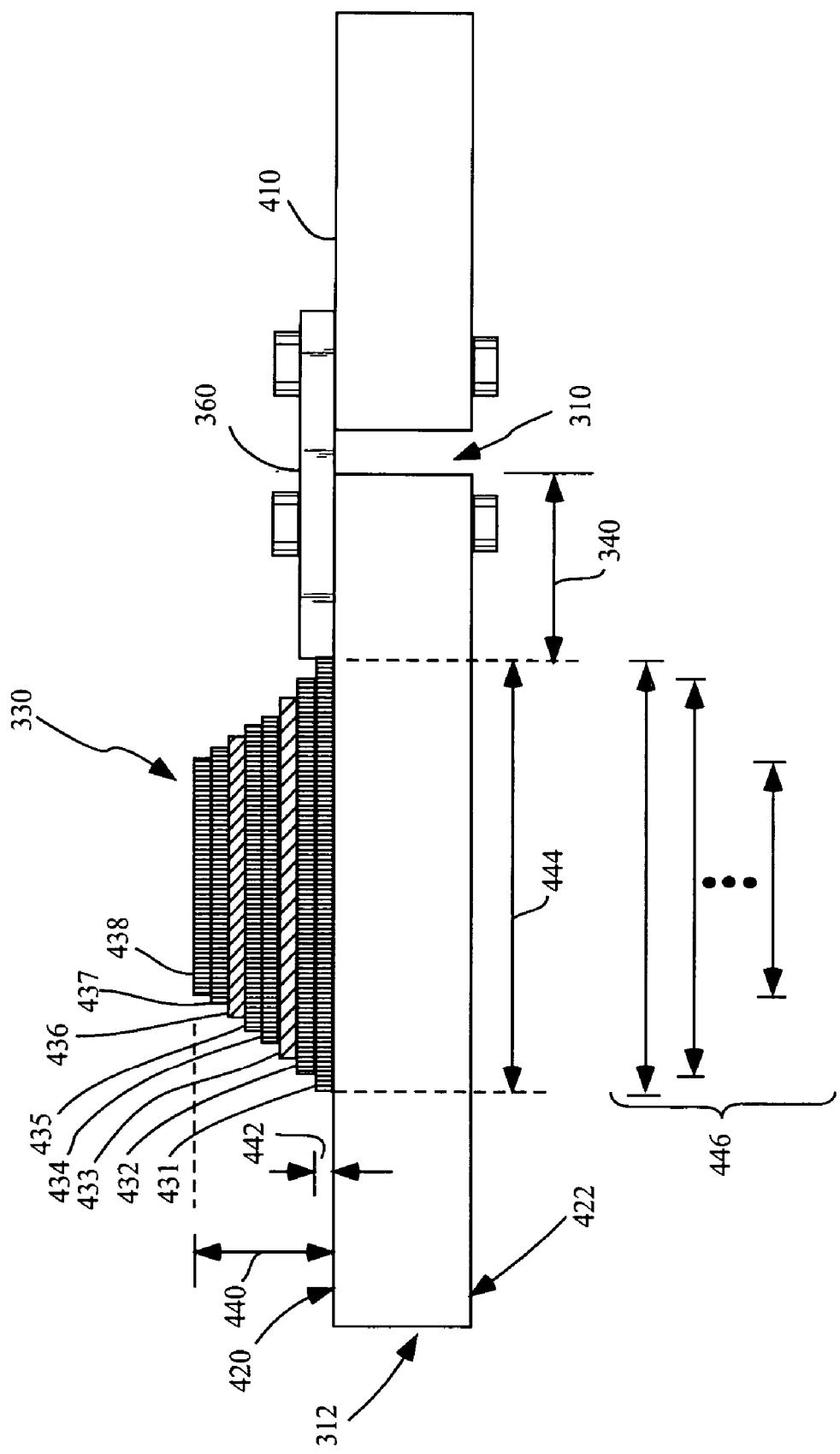
FIG. 4 depicts a simplified cross-sectional view of a curved load deflector positioned on the fairing proximate an access door aperture with an access door secured with the fairing.

FIG. 4 depicts a simplified cross-sectional view of a curved load deflector 330 positioned on the fairing 312 proximate an access door aperture 310 with an access door 410 secured with the fairing 312. The curved deflectors are typically only positioned on the exterior surface 420 of the fairing 312 and preferably not on the interior surface 422. This greatly simplifies the assembly of the fairing and access doors, and typically-reduces the time needed for assembly. Further, it eliminates many of the problems observed in previous systems that incorporated doublers on the interior surface 422. For example, because the present embodiments do not use load deflectors on the interior surface 422, the installation of an acoustic blanket is greatly simplified and can be more accurately and securely positioned. The curved load deflectors 330–331 can be laid-up during the initial fabrication of the fairing or bonded onto the fairing later when customizing fairings according to specific designs.

In some preferred embodiments, the load deflectors 330–331 are formed and/or assembled from a plurality of composite plies 431–438, each shaped to achieve the desired curvature of the deflector. The plies 431–438 are stacked on top one another with gradually tapering widths 444. The widest ply 431 is positioned on and bonded with the exterior layer 420 of the composite fairing 312. In some embodiments the widest layer 431 and the other layers are bonded using low temperature molding (LTM). The plies are stacked with decreasing width, such that the ply 438 with the smallest width is outer most away from the fairing 312. The amount of tapering between layers is typically small, because it is desirable to have the thicker area of the deflector closer to the edge 350 of the aperture 310.

The number of plies 431–438 utilized in forming the load deflectors 330–331 depend on the amount of load expected to be deflected, the size of the aperture 310, the desired thickness 440 of the deflector, the width 444 of the deflector, the curvature, and the distance 340 between the aperture and the deflector 330. Similarly, the thickness 442 of the plies and the width 446 of the plies depend on the amount of load expected to be deflected and/or design load, the size of the aperture 310, the desired thickness 440 of the deflector, the width 444 of the deflector, the curvature, and the distance 340 between the aperture and the deflector 330. In preferred embodiments, these parameters are optimized together to achieve an optimal deflector.

The layers 431–438 of the curved deflectors 330–331 are typically formed from a fibrous and/or woven cloth. The layers are manufactured or cut to achieve a predefined orientation of the fibers of the cloth. In stacking the layers, it is preferred that the number of layers having fibers oriented in a 0/90° orientation and positioned so that the fibers are generally parallel with the Y-axis (see FIG. 3) exceed layers positioned with other fiber orientation. For example, a curved deflector can be constructed of eight (8) layers 431–438. The first two layers 431–432 can be formed from cloth having a 0/90° fiber orientation and parallel with the Y-axis. A third layer 433 can have fibers oriented at a 45° orientation. A fourth and fifth layer 434–435 can have fibers with 0/90° orientation, a sixth layer 436 can be formed from a cloth having a 45° fiber orientation, and seventh and eighth layers 437–438 can have 0/90° orientation. This stacking forms the deflectors and achieves a pseudo- and/or cross-isotropic configuration for the deflectors that can provide additional stiffness, and in some instances equal stiffness in all directions.

The 0/90° oriented layers typically provide greater load deflection that the 45° oriented layers. As such, the present embodiments preferably incorporate a greater number of 0/90 oriented layers. A sufficient number of 45° oriented layers are preferably included to establish a cross-isotropic configuration for the curved deflectors. The additional 0/90° layers further enhance the load deflection. An equal number of 0/90° and 45° layers can be used, or a greater number of 45° layers can be used. Other orientations or different types of layering can be used without departing from the novel aspects of the present invention.

The layers can be stacked in other orientation configurations to assemble the desired curved deflector 330–331. For example, a deflector can be assembled with three 0/90° oriented layers, then two 45° oriented layers, then three 0/90° oriented layers, and so on. Substantially any number of plies can be utilized to form the deflector, depending on the desired thickness 440 of the deflector 330. In some embodiments, eight to twelve plies can be used to form the deflector.

Some preferred embodiments provide further deflection of the axial load from the load concentration point along the edge of the aperture. These embodiments incorporate one or more additional plies on the exterior surface or facesheet 420 of the fairing 312. In some embodiments, these additional plies are applied over the curved load deflectors 330, 331 and/or bonded with the load deflectors and exterior surface 420 of a fairing. In some preferred embodiments, the plies are applied through tape. These additional plies can provide additional margins of safety for facesheet wrinkling failures.

Figure 5:
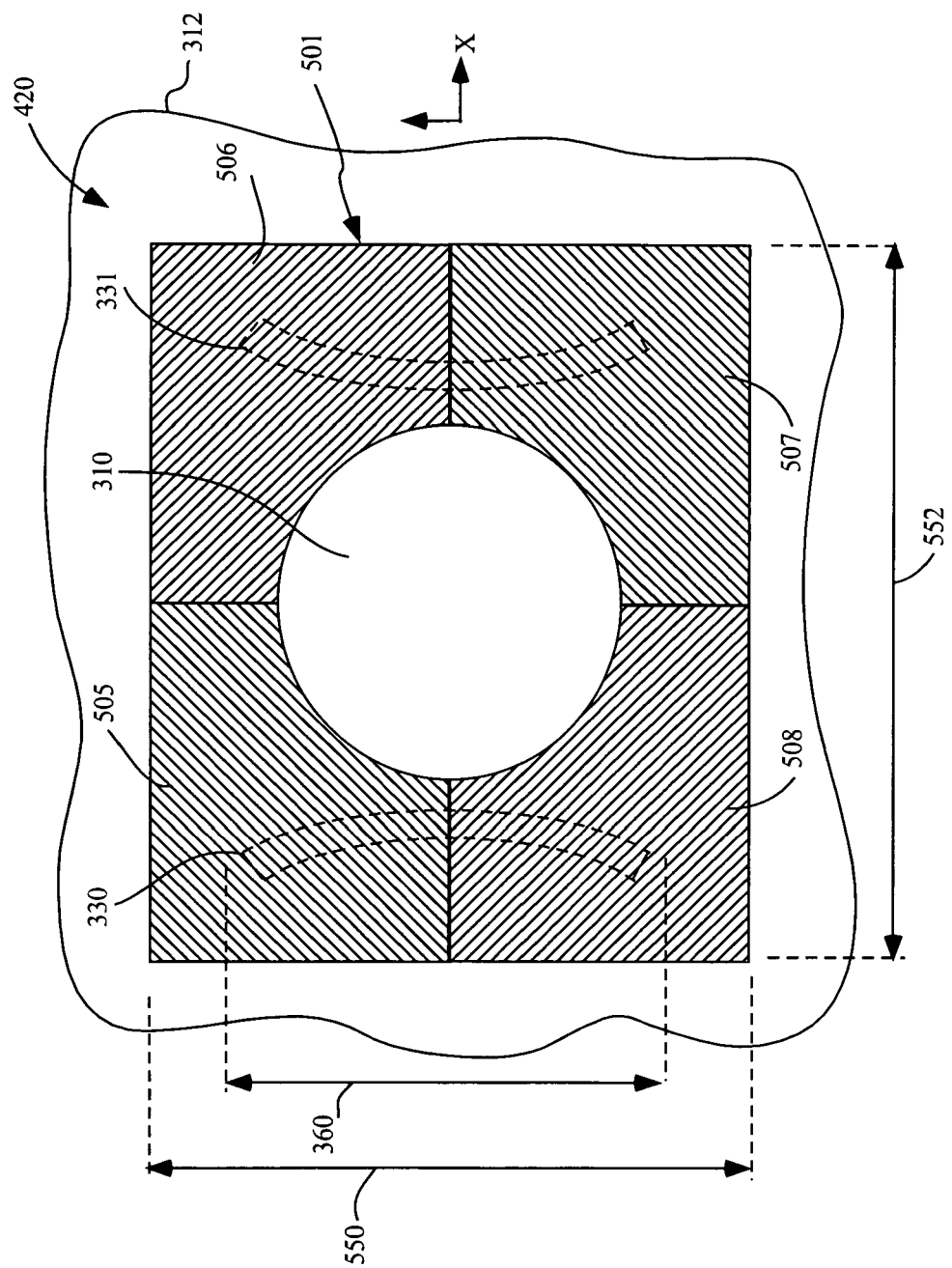
FIG. 5 depicts a plane view, simplified block diagram of a portion of a fairing with an access door aperture formed in the fairing.

FIG. 5 depicts a plane view, simplified block diagram of a portion of a fairing 312 with an access door aperture 310 formed in the fairing. Two curved load deflectors 330–331 have been assembled on the fairing proximate the aperture 310. Over the load deflectors 330–331, a patch of overlay plies 501 have been bonded and/or secured with the fairing facesheet 420.

In some preferred embodiments, the overlay plies are divided into a plurality of regions 505–508. In each of these regions, tape, ribbon, a sheet or other ply material is bonded with the facesheet 420 and load deflectors 430–431 to form the patch 501. The tape and/or plies are typically formed from materials that have weaves such as woven cloth. The overlaid plies 505–508 are specifically arranged so that the orientation of the weaves is at an angle relative to the X-axis. In some embodiments, the plies are positioned so that the weaves have a +45° or −45° orientation. Other orientations can be utilized, such as +/−30°0, +/−50° and other similar orientations.

In some embodiments, first and third regions or quadrants 505 and 507, respectively, can be overlaid with tape or material having a +45° orientation, relative to the X-axis. Alternatively, second and fourth quadrants 506 and 508, respectively, can be overlaid with tape or material having a −45° orientation. As such, the resulting overlay patch 501 has a diamond shaped orientation. This diamond shape orientation aids in deflecting and/or redirecting loads around the access door aperture 310. Multiple layers of the tape and/or material can be applied to each region 505–508 to establish a desired thickness of the overlay. In some preferred embodiments the patch comprises two or three layers of tape and/or material.

Figure 6:
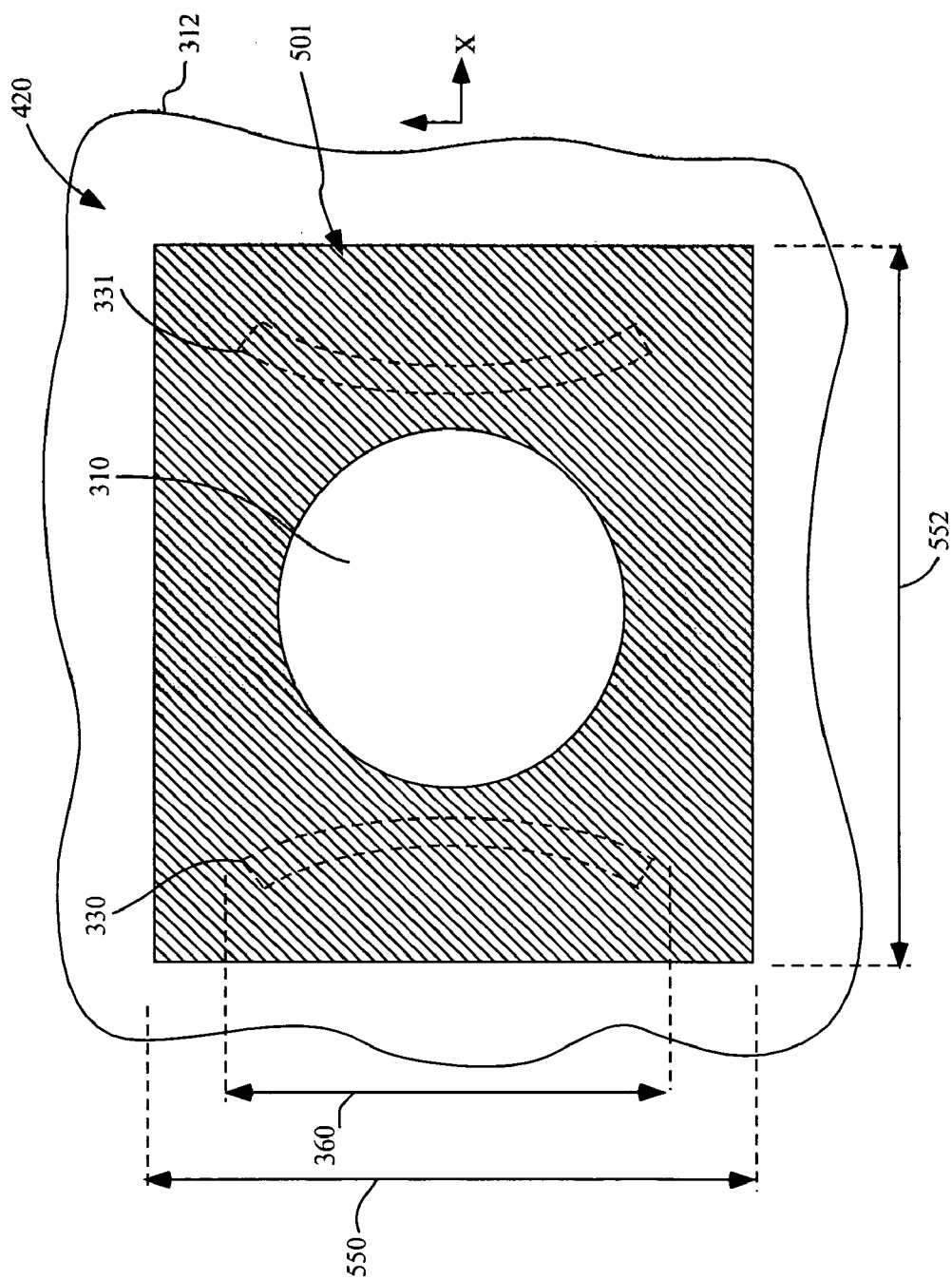
FIG. 6 depicts a plane view, simplified block diagram of a portion of a fairing with an access door aperture formed in the fairing, similar to FIG. 5.

FIG. 6 depicts a plane view, simplified block diagram of a portion of a fairing 312 with an access door aperture 310 formed in the fairing, similar to FIG. 5. Again, two curved load deflectors 330–331 have been assembled on the fairing proximate the aperture 310. Over the load deflectors 330–331, an overlay patch 501 has been bonded and/or secured with the fairing facesheet 420.

Still further, the overlay patch 501 is formed of a single sheet of material, such as a woven cloth. The material is positioned such that the weaves have a plus or minus 45° orientation relative to the X-axis. Again the 45° orientation provides further load deflection away from the aperture 310. Any number of plies can be added to establish the desired thickness and rigidity, for example, two, three, four or more plies can be applied.

The plies are configured from tape and/or woven cloth. The weaves of the cloth can be formed of substantially any material providing desired protection, stiffness, flexibility, workability and other similar desired characteristics such that the spacecraft can be fabricated, assembled and deployed. In some embodiments, the plies are a woven graphite/epoxy cloth or other similar material. The cloth of the plies is typically woven such that fibers of the weave are at generally right angles to each other. The tape and/or material forming the patch 501 can be bonded to the facesheet 420 and deflectors 330–331 through substantially any method, such as LTM, other resins, heat curing and the like.

Referring to FIGS. 5 and 6, the length 550 and width 552 of the overlay patch(es) 501 are preferably greater than the diameter of the aperture. The overlay patches 501 shown in FIGS. 5 and 6 are depicted with dimensions such that the width 552 of the overlay patch 501 is wider than the lengths 360 of the curved deflectors, and length of the patch 552 is sufficient to cover both curved deflectors.

The beneficial load deflection is provided by the patch when the patch surrounds the aperture 310. In some embodiments, the patch additionally covers the load deflectors 330–331. This can provide a smoother surface for the final fairing. However, the overlay patch(es) can be configured so that they do not cover or do not fully cover the curved deflectors. Similarly, the shape of the patch 501 can be substantially any shape, round, oval, rectangular or other similar shapes, so long as the patch surrounds the access door aperture 310.

The present embodiments simplify the assembly of a fairing by allowing a single fairing design to be constructed, and then access doors can be incorporated into the fairing after the fairing has been constructed. This stream lines the fairing assembly process, and simplifies the equipment and tooling required to construct the fairings. Access doors can be cut into the fairing after the fairing is constructed according to specific designs. The present embodiments employ curved load deflectors that deflect or redirect axial loads so that the fairing and access door apertures meet failure requirements such as shear crimping and facesheet wrinkling.

Further, the assembling of the fairing and access doors are simplified because the present embodiments provide improved load deflection while utilizing load deflectors only on the exterior surface or facesheet of the fairing. The present embodiments do not require additional load deflectors to be incorporated onto the interior surface of the fairing. As such, the time, materials, man power, tools and cost of incorporating deflectors on the interior surface is eliminated.

The curved load deflectors and/or additionally overlay patch(es) 501 can be mounted and/or bonded with the fairing utilizing LTM or substantially any other curing techniques. Further, the present embodiments provide improved load deflection without incorporating or adding additional reinforcements around the perimeter of the aperture. Some preferred embodiments avoid incorporating an additional composite bonded or puttied about the edge of the aperture. The inventor has determined that in many configurations adding an additional reinforcement composite along the edge of the aperture actually increases loads at the edge of the aperture because the added reinforcement pulls loads to the aperture edge. Further, in some preferred embodiments, further reinforcement or bulk is not added to the region between the curved load deflectors 330–331 and the aperture edge 350, other than the added overlay patch(es) 501.

Again, the precise shape, including the curvature, thickness, width, length and the like, and the positioning of the curved load deflectors 330–331 of the present embodiments are interdependent and further depend on the size of the aperture being reinforced. An optimal design of the curved deflector can be determined once an access door is defined, for example, by an end user. The curvature, width, thickness and positioning are particularly interdependent. For example, a positioning can initially be determined (e.g., positioned adjacent to and just in contact with a door cover 358 (see FIG. 3). Knowing the size of the aperture and the positioning of the deflector, the curvature, thickness and width can be determined to better optimize the load deflection.

The thickness, width and length are also dependent on the amount of material utilized to form the deflectors. The present embodiments attempt to minimize the amount of material used while still providing sufficient load deflection to meet and/or preferably exceed safety margins for at least the shear crimping and facesheet wrinkling. Further, the present embodiments attempt to limit the amount of material so as to avoid, or minimize, lay-up imbalances on the overall final fairing.

The shape of the curved deflector is also dependent on whether the fairing is pressure supported. Some fairings include interior pressure hoop supports. These hoop supports provide added rigidity and increase the structural integrity of the fairing. Access door apertures 310 formed in fairings with interior pressure support may not need as much load deflection as door apertures formed in fairings without interior support. As a result, the size and shape of the deflector might be reduced for fairings with interior supports while still achieving the desired margins of safety.

Further, a balance is employed between the width 444 and the thickness 440 of the curved deflectors (see FIG. 4). It is noted that the greater the thickness 440, typically, the greater the load that can be pulled by the deflector 330. If the thickness is too great, the load pulled may exceed thresholds of the core of the fairing and the core will crack from the pulled loads. The pulled load can, however, be distributed over a greater area by widening the curved load deflector. As such, there is balance that can be established in designing and incorporating the curved load deflector between the width 444 and the thickness 440. It is noted that the amount of load deflection can begin to diminish at the edge of the curved deflector 330 farthest from the aperture as the width is extended away from the aperture edge. Therefore, the width 444 is further limited by the distance from the edge of the aperture.

It is desirable to minimize the width and thickness of the curved deflectors, while still meeting safety margins. In minimizing the width and thickness, it is desirable to maintain the positioning of the deflectors close to the aperture, and in some embodiments as close as possible.

The load deflectors 330–331 are specifically configured to provide load deflection. The load deflectors 330, 331 described above are curved along the length 360 of the deflector. However, other configurations for the load deflector are contemplated while still providing load deflection. For example, the load deflectors can have a generally "V" shape. The "V" shape can similarly provide load deflection of the axial loads. However, the sharp bends in the deflector may concentrate pulled load.

Figure 7:
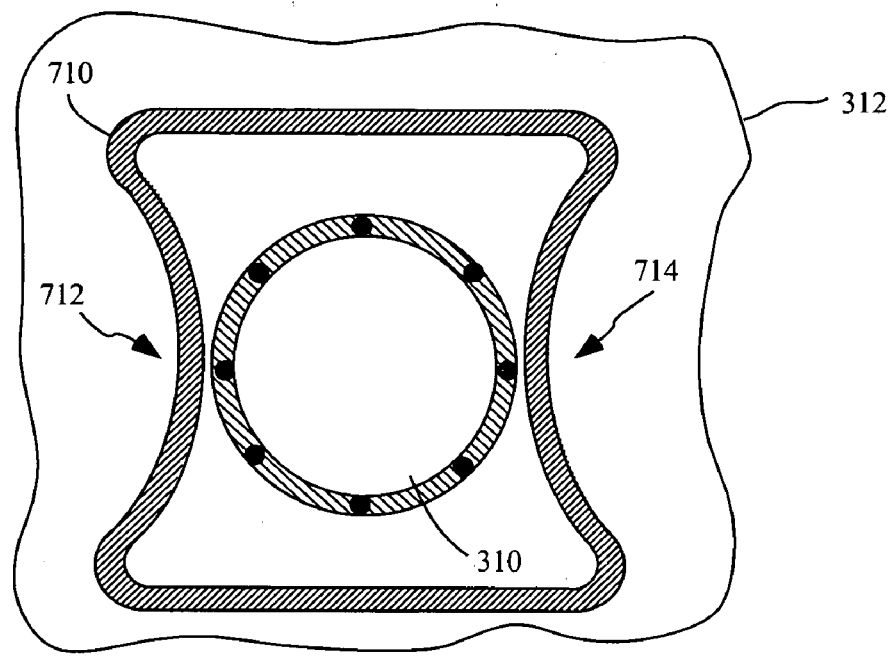
FIG. 7 shows a single load deflector that includes curved portions.
Figure 8:
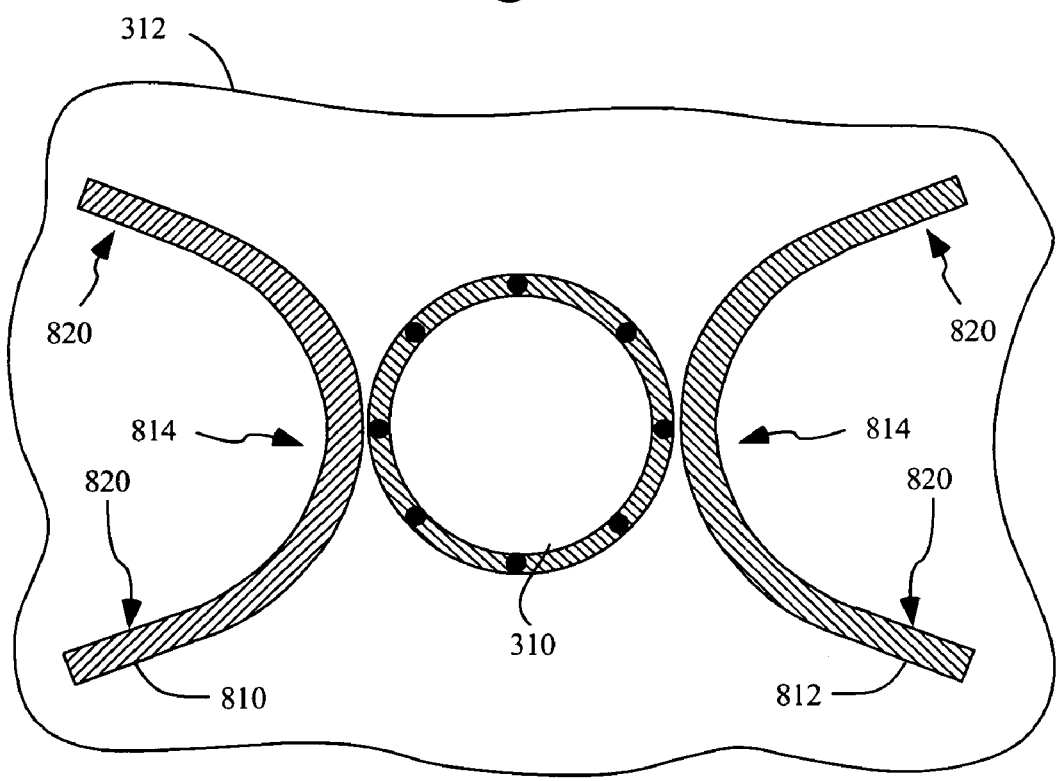
FIG. 8 shows two load deflectors that include curved and strait portions.

Similarly, other shapes can be utilized that incorporate the curvature of the deflector to achieve the desired load deflection. FIGS. 7–8 depict simplified plane views of portions of fairings 112 with access door aperture 110 and load deflectors secured on the fairings. FIG. 7 shows a single load deflector 710 that includes curved portions 712 and 714. The curved portions have defined curvatures to provide the desired load deflection. Further, defined the curvatures are dependent on the placement of the deflector 710 relative to the aperture 310. The curved portions are typically positioned closest to the aperture to provide the load deflection.

FIG. 8 shows two load deflectors 810 and 812. The load deflectors include curved portions 814, and strait portions 820. The curved portions have a defined curvature that provides the desired load deflection.

The present embodiments have been shown with deflectors 330–331 positioned only on the sides (3 and 9 o'clock) of the access door apertures 310. Additional deflectors can be employed at the sides, as well as along the Y-axis, for example at the 12 and 6 o'clock positions.

Incorporating the curved load deflectors 330–331, for example similar to those shown in FIG. 3, some embodiments provide more than a 20% increase in load deflection than was achieved with previous designs such as the "H" shaped doublers.

Figure 10:
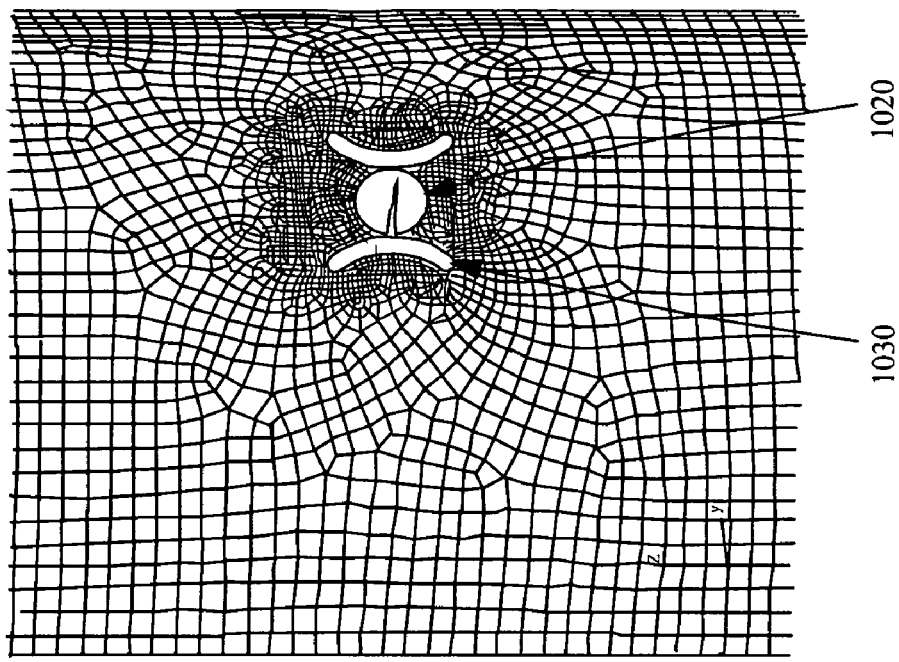
FIG. 10 shows a graphical representation of a non-linear analysis for shear crimping linear buckling of the aperture formed in the isotropic material with curved load deflectors according to present embodiments.
Figure 9:
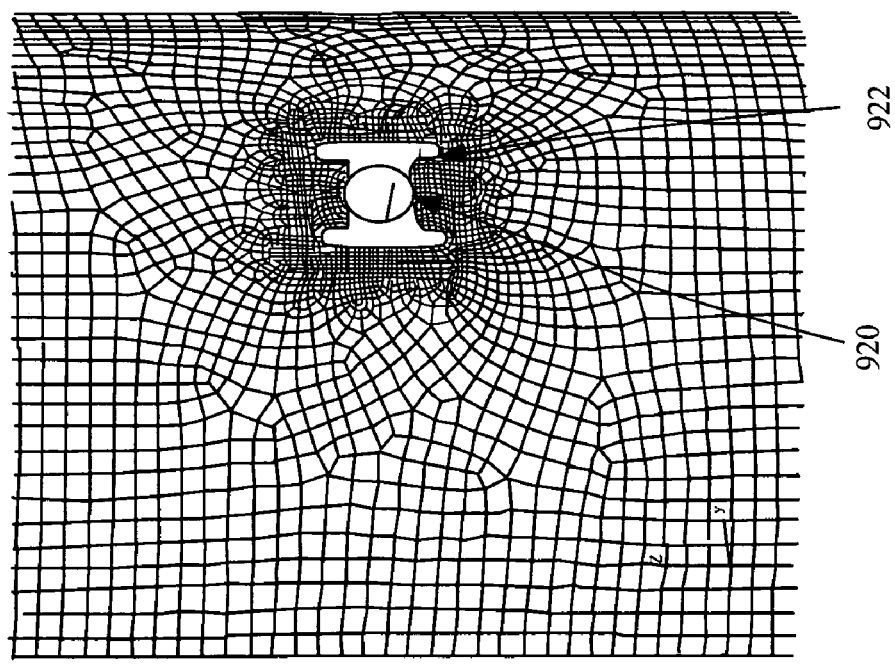
FIG. 9 shows a graphical representation of a non-linear analysis for shear crimping linear buckling of an aperture formed simply in an isotropic material, without any composite, with strait load deflectors.

The use of curved load deflectors provides reduced loads applied at apertures in a fairing, reduces local bending at the apertures and improve safety margins. FIGS. 9 and 10 demonstrate the load deflection benefits obtained through curved load deflectors of the present embodiments. More specifically, FIG. 9 shows a graphical representation of a non-linear analysis for shear crimping linear buckling of an aperture 920 formed simply in an isotropic material, without any composite, such as regular aluminum or other isotropic materials. The aperture is reinforced with straight doublers 922. FIG. 10 shows a graphical representation of a non-linear analysis for shear crimping linear buckling of the aperture 1020 formed in the isotropic material. The aperture has, however, been reinforced with curved load deflectors 1030 and 1031 according to some present embodiments. The curved deflectors 1030 and 1031 are formed without any optimization of width, thickness and positioning.

A non-linear analysis comparison of the load deflections provided simply by curved load deflectors 830 and 831 versus the straight doublers 722 for an isotropic material demonstrates at least a 9% increase in critical load deflection achieved by the curved load deflectors 830–831 than achieved by the straight doublers 722. Better optimizing the structure of the curved load deflectors (i.e., width, thickness, positioning and the like) provides additional load deflections. Additionally, by adding one or more the overlay patches 501 (see FIG. 5), still further load deflection can be achieved. Utilizing one or more overlay patches can provide improvements in load deflection of an additional 10% and more. Some embodiments can achieve an increase in total load deflections of 40% and more over previous load doubler designs.

The curved load deflectors provide geometric benefits in at least two respects. First, the curved shape directs the loads to redistribute the loads at the access door aperture along different load paths. Second, as axial load and pressure is applied to the curved load deflectors, the curvature allow the deflectors to bend providing added support to the aperture edge. The present embodiments additionally provide directional advantages. Configuring the load deflectors with a majority of 0/90° orientation, and then incorporating the overlay patch(es) at 45°, a directional effect provides an additional change in load path.

Further, the curved load deflectors shift or redirect the load stresses from the 3 and 9 o'clock positions on an aperture. The overlay patch provides additional redirection of the load stresses. The load stresses can be shifted out towards the 2 and 4, and 8 and 10 o'clock positions. In some embodiments, the loads stresses can be shifted out near and/or beyond the 1 and 5, and 7 and 11 o'clock positions.

The embodiments shown and described above were described in reference to circular access door apertures. However, the curved deflectors and/or overlay patch can additionally provide load deflection benefits to other shaped access door apertures. For example, the curved deflectors and/or the overlay patch(es) can provide load deflection for access door apertures that are oval, elliptical and other similar curved shapes and in some instances other non-curved shapes.

The present embodiments utilizing curved load deflectors provide the positive margin of safety for shear crimping and/or facesheet wrinkling failure modes without the need to include deflectors and/or doublers on the interior of the fairing. This greatly reduces the assembly process and time for assembly. Further, eliminating the need to include deflectors and/or doublers improves the assembly of the fairing. For example, one or more acoustic blankets can be incorporated into the fairing without interference from interior doublers.

While the invention herein disclosed has been described by means of specific embodiments and applications thereof, numerous modifications and variations could be made thereto by those skilled in the art without departing from the scope of the invention set fourth in the claims.

The invention claimed is:

1. An apparatus for use in deflecting loads, comprising:
   a door aperture formed in a facesheet, wherein the door aperture has an edge;
   a first load deflector having a length, wherein the first load deflector is curved along at least a portion of its length; and
   the first load deflector is secured with the facesheet such that the first load deflector is proximate the door aperture with a middle portion of the curved load deflector is closest to the aperture such that the first load deflector deflects a load.

2. The apparatus of claim 1, wherein the first curved load deflector comprises a plurality of layers and each layer has an orientation such that at least half of the plurality of layers have an orientation perpendicular to the axial load.

3. The apparatus of claim 1, further comprising:
   a patch bonded with the facesheet proximate the door aperture such that the patch at least surrounds the door aperture.

4. The apparatus of claim 3, wherein the patch has four quadrants and each quadrant is formed of at least one ply, each of the four plies having an orientation, wherein a first and third quadrant have a first orientation, and a second and fourth quadrant have a second orientation where the second orientation is different than the first orientation.

5. The apparatus of claim 3, wherein the first and third plies have an orientation that is at about a positive 45 degrees with respect to the axial load prior to deflection by the first curved load deflectors, and the second and fourth plies have an orientation that is at about a negative 45 degrees with respect to the axial load prior to deflection by the first curved load deflectors.

6. The apparatus of claim 3, wherein the patch is formed of at least two plies stacked and bonded with each other on the facesheet such that both plies surround the door aperture.

7. The apparatus of claim 6, wherein the patch has an orientation that is not parallel with respect to the axial load prior to deflection by the first curved load deflectors.

8. The apparatus of claim 7, wherein the orientation of the patch is at about 45 degrees with respect to the axial load prior to deflection by the first curved load deflectors.

9. The apparatus of claim 3, wherein the patch extends over and covers the first curved load deflector.

10. The apparatus of claim 9, further comprising a second curved load deflector secured with the facesheet proximate the door aperture and on an opposite side of the door aperture than the first curved load deflector; and
    the second load deflector having a length, wherein the second load deflector is curved along at least a portion of its length such that the second load deflector deflects the axial load.

11. The apparatus of claim 1, further comprising a second curved load deflector secured with the facesheet proximate the door aperture and on an opposite side of the door aperture than the first curved load deflector; and
    the second load deflector having a length, wherein the second load deflector is curved along at least a portion of its length such that the second load deflector deflects the axial load.

12. An apparatus for use in reinforcing an access door, comprising:
    a first load deflector positioned on a facesheet proximate an access door aperture;
    the first load deflector having a first length such that the first load deflector is curved along at least a portion of its length;
    the first curved load deflector having a first defined curvature such that the first defined curvature of the first load deflector is proportional to a size of the access door aperture;
    a second load deflector positioned on the facesheet proximate the access door aperture;
    the second load deflector having a second length such that the second load deflector is curved along at least a portion of its length; and
    the second curved load deflector having a second defined curvature such that the second defined curvature of the second load deflector is proportional to the size of the access door aperture.

13. The apparatus of claim 12, wherein the first and second curved load deflectors have thicknesses, wherein the first and second thicknesses are proportional to the size of the access door aperture and are dependent on the defined curvatures of the first and second load deflectors, respectively; and
    the defined curvatures of the first and second load deflectors, are further dependent on the thicknesses of the first and second load deflectors, respectively.

14. The apparatus of claim 13, wherein the first and second curved load deflectors, have widths, wherein the widths are proportional to the size of the access door aperture and are dependent on the defined curvatures of the first and second load deflectors, respectively, and further dependent on the thicknesses of the first and second load deflectors, respectively;
    the defined curvatures of the first and second load deflectors are further dependent on the widths of the first and second load deflectors, respectively; and
    the first and second thicknesses are further dependent on the widths of the first and second load deflectors, respectively.

15. The apparatus of claim 12, wherein the first end second curved load deflectors have widths, wherein the first and second widths are proportional to the size of the access door aperture and are dependent on the defined curvatures of the first and second load deflectors, respectively; and
    the defined curvatures of the first and second load deflectors are further dependent on the first and second widths of the first and second load deflectors, respectively.

16. The apparatus of claim 12, further comprising:
    an overlay patch secured with the facesheet and surrounding the access door aperture.

* * * * *